Figure 1:
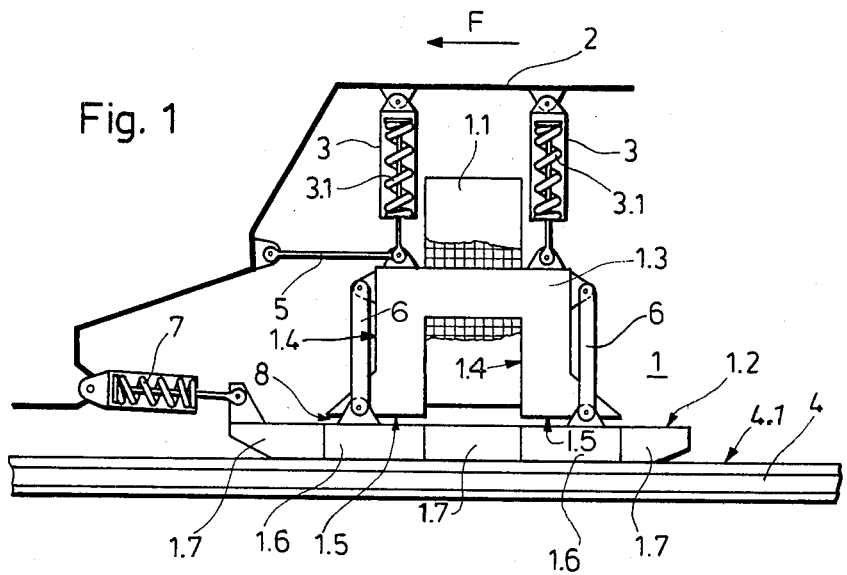

United States Patent [19]

Steinmetz et al.

[11] Patent Number: 4,484,666

[45] Date of Patent: Nov. 27, 1984

[54] ELECTROMAGNETIC SLIDING SHOE BRAKE

[75] Inventors: Guenter Steinmetz, Grafing b.Mch.; Walter Brezina, Munich; Ulf Steenbeck, Putzbrunn, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 440,807

[22] Filed: Nov. 12, 1982

Related U.S. Application Data

[63] Continuation of Ser. No. 217,254, Dec. 17, 1980, abandoned.

[30] Foreign Application Priority Data

Jan. 15, 1980 [DE]   Fed. Rep. of Germany ....... 3001235

[51] Int. Cl.³ .............................................. B60L 7/00
[52] U.S. Cl. ...................................... 188/165; 105/77
[58] Field of Search ................... 188/165, 164, 38, 41, 188/42, 72.1, 72.2, 206 R, 212; 105/77

[56] References Cited

U.S. PATENT DOCUMENTS

| 597,432 | 1/1898 | De Redon | 188/165 |
| 616,956 | 1/1899 | Newell | 188/165 X |
| 1,246,257 | 11/1917 | Gelt | 188/165 |
| 2,096,485 | 10/1937 | Farmer | 188/165 |
| 2,130,615 | 9/1938 | Critterden | 188/165 |
| 3,723,795 | 3/1973 | Baermann | 188/41 |

FOREIGN PATENT DOCUMENTS

| 610122 | 3/1935 | Fed. Rep. of Germany | 188/165 |
| 846525 | 5/1939 | France | 188/165 |
| 653159 | 3/1979 | U.S.S.R. | 105/77 |

Primary Examiner—George E. A. Halvosa
Attorney, Agent, or Firm—W. G. Fasse; D. H. Kane, Jr.

[57] ABSTRACT

An electromagnetic sliding shoe brake also referred to as a slipper shoe brake is constructed especially for use in or on rail vehicles, especially high speed rail vehicles. The magnetic core, with its energizing coil, has at least two pole pieces. The sliding brake shoe comprises ferromagnetic pole plates alternating with interconnecting magnetically insulating members. The pole plates, or rather the brake shoe, is connected to the magnetic core substantially in a frictionless manner. The brake shoe is connected to the magnetic core by parallelogram type pivoting elements and biased against the chassis by one or two springs (7) which will assure that in operation the brake shoe is pressed against a brake force take-up member at least with a predetermined brake force which will be substantially constant and independent of the friction coefficient between the brake shoe and the brake force take-up member such as a rail.

5 Claims, 3 Drawing Figures

U.S. Patent

Nov. 27, 1984

4,484,666

ELECTROMAGNETIC SLIDING SHOE BRAKE

This is a continuation of application Ser. No. 217,254 filed Dec. 17, 1980, now abandoned.

BACKGROUND OF THE INVENTION

The present invention relates to an electromagnetic sliding shoe brake comprising a brake shoe which is pulled against a ferromagnetic take-up member for applying a predetermined brake force to the take-up member. Such ferromagnetic take-up member may, for example, be a rail when this type of brake is installed in or on a rail vehicle.

Such a brake is, for example, necessary where it is not possible to apply a sufficient brake force to a rail vehicle solely by means of the brake force applied to the wheels to thereby achieve a sufficient deceleration for example in an emergency. In such situations it is conventional to generate additional braking forces by means of a sliding shoe brake also referred to as a slipper shoe brake. Such additional brake forces are produced by friction between the brake or slipper shoe and the top surface of the rail caused by corresponding electromagnetic attraction forces between the sliding shoe and the rail. In such a use the electromagnetic slide shoe brake actually functions as an emergency brake which must satisfy several requirements. On the one hand an emergency brake must assure the application of a certain minimum brake force. Normally, such minimum brake force is larger than the maximum brake force applied to the rail vehicle by the service brake such as an electrical service brake of the rail vehicle. On the other hand, it is required that the maximum brake force of the emergency brake or of the sliding shoe brake is only insignificantly larger than its minimum brake force. However, this minimum brake force must be determined in accordance with a minimum friction coefficient between the sliding shoe and the rail in order to achieve the minimum brake force which is required for obtaining the necessary deceleration of the rail vehicle for any friction coefficient. As a result, the normally present friction coefficients are at least four times larger than the minimal friction coefficient, whereby correspondingly larger brake forces are caused. These larger brake forces result in a respectively larger, undesired vehicle deceleration which substantially reduce the passenger safety. Additionally, these undesirably large decelerations result in an unnecessarily large loading of the rail track body or of the roadway or roadbed.

Heretofore, such loading of the rail track or roadbed required meeting, among other conditions, the condition that the road construction is over-dimensioned. The over-dimensioning of the track was especially required for elevated tracks which are capable of taking up longitudinal loads only to a limited extent. Such over-dimensioning was necessary heretofore especially for tracks constructed for high speed vehicles, for example, magnetic levitation vehicles.

In view of the foregoing it is clear that a sliding shoe brake which is designed to meet the first requirement, namely to provide a certain minimum braking force, will not satisfy the second requirement that the maximum braking force resulting from normal frictional coefficients will not be substantially larger than the minimum braking force so that vehicle decelerations will always correspond to decelerations resulting from the application of the minimum braking force by the sliding shoe brake.

OBJECTS OF THE INVENTION

In view of the above it is the aim of the invention to achieve the following objects singly or in combination:

to construct a sliding shoe brake of the type described above which is capable to compensate for the variations of the friction coefficient between the sliding shoe and the cooperating brake surface such as the top of a rail so that the effect of the braking action on the respective vehicle will substantially be constant at all times and under all operating conditions;

to construct a sliding shoe brake in such a manner that it will simultaneously satisfy the above stated conditions, namely, that the minimum brake force and the maximum brake force are substantially the same;

to limit the maximum brake force that may be applied by the sliding shoe brake;

to construct a sliding shoe brake in such a manner that the electromagnetic attraction forces are automatically adjusted in response to friction coefficient variations between the sliding shoe and the surface to which the brake force is applied;

to make sure that the reaction time of the sliding shoe brake becomes the smaller the larger the relative speed is between the sliding shoe and the surface to which the brake force is applied, whereby the present brake is particularly suitable for use in high speed rail vehicles, particularly magnetic levitation vehicles; and to provide a sliding shoe brake which is passively adjusted in its brake pressure so that the brake becomes absolutely failsafe.

SUMMARY OF THE INVENTION

According to the invention there is provided an electromagnetic sliding shoe brake having a magnetic energizing coil which may be energized for pulling the sliding shoe against a ferromagnetic braking surface constituted by a member for taking up the braking force such as the surface of a rail forming the track. The magnetic coil magnetizes a magnetic core having at least two pole pieces of alternating or rather opposite polarity. Each pole piece has a respective pole face. The sliding brake shoe is operatively held between the pole faces and the surface to which the brake force is to be applied. The brake shoe is constructed to comprise ferromagnetic pole plates alternating with magnetically insulating spacer members. The pole plates of the sliding brake shoe contact the magnetic core or rather the pole faces of the pole pieces of the magnetic core in a manner substantially free of friction. The sliding brake shoe is held in a rated position relative to the magnetic core under the effect of a biasing spring in response to the friction between the sliding brake shoe and the surface to which the brake force is applied, such as the top of a rail. The effect of the biasing spring is adjustable in accordance with a predetermined brake force. Stated differently, the sliding brake shoe is held in a rated position relative to the magnetic core by means of a spring only until a minimum brake force is achieved, preferably the above mentioned minimum brake force which is determined by the respective spring biasing. In this rated position of the sliding brake shoe relative to the magnetic core the electromagnetic field, which is closed through the member taking up the braking force, is substantially undistorted. To keep the magnetic field substantially undistorted is particularly suitable for determining or calculating the minimum brake force which is determined by the minimum friction value between the sliding brake shoe and the surface taking up the braking force. When the minimum friction coefficient is exceeded, the correspondingly larger longitudinal force applied by the brake shoe to the spring will exceed the spring biasing so that the sliding brake shoe is moved out of the above mentioned rated position relative to the magnetic core or rather its pole faces in response to the friction at the surface taking up the brake force. As a result, the magnetic field is distorted, whereby the electromagnetic stray flux is increased between the magnetic energizing coil and the surface taking up the brake force depending on the extent of the displacement of the sliding brake shoe which in turn depends on the selected spring stiffness. On the other hand, the displacement of the sliding brake shoe results in a corresponding reduction of the cross-sectional areas between the pole faces of the magnetic core and the pole plates of the sliding brake shoe through which the effective electromagnetic flux flows. As a result, the effective air gap between the magnetic coil and the surface taking up the braking force is increased. This air gap increase has the advantage that it occurs independently of the position of the magnetic core relative to the direction of the relative movement between the magnetic core and the surface taking up the braking force.

Both effects, namely the distortion of the magnetic field and the increase of the effective air gap result in a reduction of the electromagnetic attraction forces between the sliding brake shoe and the surface taking up the braking force, whereby the latter is limited accordingly. Thus, in a brake according to the invention the electromagnetic attraction forces are automatically adjusted in response to the friction values or in response to the friction value change between the sliding brake shoe and the surface or member which takes up the braking force. Therefore, according to the invention it is possible to limit the braking forces in accordance with a predetermined value for the minimum braking force. Another advantage of the invention is seen in that the reaction time of the sliding shoe brake becomes the smaller, the larger the relative speed between the sliding brake shoe and the surface taking up the brake force is. Thus, the present brake is particularly suitable for use in connection with high speed rail bound vehicles, particularly magnetically levitated vehicles.

The foregoing adjustment of the brake force may be considered to be a passive adjustment of the sliding brake shoe against the surface taking up the brake force. Such passive adjustment has the advantage, as compared to a brake with an active control of the brake force causing pressures, that it is absolutely failsafe.

BRIEF FIGURE DESCRIPTION

Figure 2:
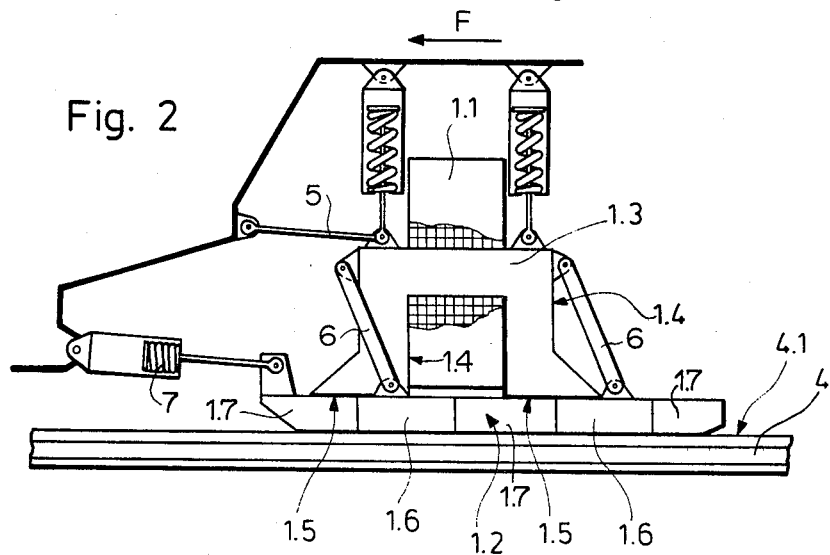
Figure 3:
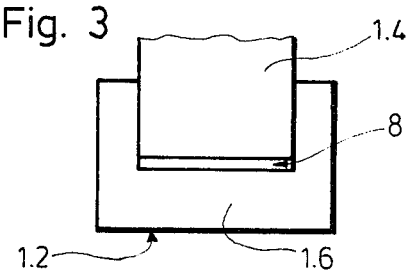

In order that the invention may be clearly understood, it will now be described, by way of example, with reference to the accompanying drawings, wherein:

FIG. 1 is a schematic side view of a sliding shoe electromagnetic brake according to the invention secured to the chassis of a rail vehicle and shown positioned above a track section, whereby the brake force is limited due to the air gap between the brake shoe and the pole faces of the magnetic core pieces;

FIG. 2 is a view similar to that of FIG. 1, however, showing a displacement of the brake shoe in the horizontal direction opposite to the traveling direction of the vehicle, whereby the brake force is again limited due to the reduction of the effective flux cross sectional area; and FIG. 3 is a schematic side view substantially in the travel direction showing only the sliding brake shoe and a portion of the magnetic core of a sliding brake shoe according to FIGS. 1 and 2 for explaining the effect of the air gap.

DETAILED DESCRIPTION OF PREFERRED EXAMPLE EMBODIMENTS AND OF THE BEST MODE OF THE INVENTION

FIG. 1 shows an emergency brake 1 secured to the chassis 2 of a rail bound vehicle. The brake 1 is an electromagnetic sliding shoe brake secured to the chassis 2 by conventional support means 3 which suspend the brake 1 from the chassis 2 above the rails 4 of a track. The support means 3 comprise compression springs 3.1 guided in respective cylinders which in turn are pivoted to the chassis 2 at the upper end thereof and to the magnetic core 1.3 at the lower end thereof. When the brake is not energized, the compression springs 3.1 suspend the entire brake structure vertically. The magnetic core 1.3 with its energizing coil 1.1 is held against displacement in the horizontal direction by a rod 5 also pivoted to the chassis 2 and to the magnetic core 1.3. However, the brake shoe 1.2 is displaceable substantially horizontally. The vehicle travels in the direction indicated by the arrow F. The slide brake shoe 1.2 is suspended by parallel bars 6, the upper ends of which are pivoted to the upper end of the magnetic core 1.3. The lower ends of the parallel bars 6 are pivoted to the brake shoe 1.2. Thus, the horizontal portion of the magnetic core 1.3, the parallel bars 6, and the brake shoe 1.2 form a parallelogram of which the brake shoe portion is movable to the extent permitted by the parallel bars 6 and the spring 7 as will be described in more detail below.

In order to operate the sliding shoe brake 1 its magnetic coil 1.1 is energized by a d.c. source not shown. As a result, and as shown in FIG. 1, the brake shoe 1.2 is pulled against the rail 4 acting as a brake force take up member. Thus, the brake shoe 1.2 slides with friction on the top surface 4.1 of the rail 4 acting as a brake surface. As a result, the brake force or the resulting brake force of the sliding shoe brake 1 is automatically adjusted depending on the variation of the coefficient of friction between the sliding shoe 1.2 and the top surface 4.1 of the rail 4. For this purpose the magnetic core 1.3 which carries the magnetic core 1.1 on its upper leg, comprises at least two magnetic pole pieces 1.4 having opposite polarities. The pole pieces 1.4 have downwardly facing pole faces 1.5, the surface area of which is enlarged by the lateral feet forming these pole faces 1.5. Additionally, the sliding shoe 1.2 is made of ferromagnetic pole plates 1.6 alternating with magnetically insulating, nonmagnetic spacer members 1.7, for example, made of aluminum. In the example embodiment two pole plates 1.6 of ferromagnetic material are spaced from each other by a central spacer member 1.7 of nonmagnetic material and the ends of the shoe are also formed by nonmagnetic members 1.7. Due to the arrangement of the above described parallelogram, the pole plates 1.6 are movable relative to the pole faces 1.5 substantially without any friction.

Further, due to this suspension of the sliding shoe 1.2 it is assured that the shiftability or displacement of the sliding shoe 1.2 depends on the friction of the sliding shoe 1.2 on the surface 4.1 of the rail 4. This friction is limited only by the further connection of the sliding shoe 1.2 with the support means such as the chassis 2 through the spring means 7. The spring means 7 are providing a biasing force which is determined in accordance with a desired minimal brake force of the sliding shoe brake 1 in response to a minimum friction value between the sliding shoe 1.2 and the top surface 4.1 of the rail 4. Thus, only when this minimum friction value is exceeded so that the longitudinal force of the sliding shoe 1.2 effective on the spring 7 overcomes the biasing of the spring, will the sliding shoe 1.2 be displaced relative to the magnetic core 1.3 or rather relative to the pole faces 1.5 as shown in FIG. 2.

Depending on the extent of the displacement of the brake shoe, which extent is determined by the respective value of the friction coefficient, the electromagnetic attraction forces will be reduced between the sliding shoe 1.2 or rather the pole plates 1.6 thereof and the rail surface 4.1. As a result, the longitudinal force of the sliding shoe 1.2 effective on the spring 7 or rather the available or effective brake force of the sliding shoe brake 1 is limited to the above mentioned minimum brake force.

In order to assure this just described effect or function of the sliding shoe brake according to the invention, it is necessary to provide an air gap 8 shown in FIG. 1 so that the magnetic attraction forces between the brake shoe 1.2 and the rail surface 4.1 are automatically reduced as the coefficient of friction increases. Thus, it is automatically accomplished that the effective or rather the sufficient brake force or vehicle deceleration is not substantially exceeded. This air gap 8, which is present in the rated position of the sliding brake shoe 1.2, also provides the advantage that there is substantially no friction present between the pole plates 1.6 of the brake shoe 1.2 and the pole faces 1.5 of the pole pieces 1.4.

FIG. 3 shows that the air gap 8 may be kept as small as possible in the rated position of the brake shoe 1.2 if the pole plates 1.6 of the brake shoe 1.2 extend laterally upwardly along the longitudinal sides of the pole pieces 1.4 of the magnetic core 1.3. The entire brake shoe may be formed to extend laterally upwardly along the pole pieces 1.4.

If the present brake is to be used in vehicles constructed for travelling in one or the other direction without turning, a further biasing spring corresponding to spring 7 will be arranged exactly as spring 7, but in a mirror-symmetrical position thereto at the opposite end of the brake shoe 1.2. Thus, one spring 7 will be provided for each travelling direction and one spring will be effective at a time depending on the travelling direction.

The above example embodiment relates to the construction of the present brake for use primarily on a rail vehicle. However, it will be appreciated that the present brake is not limited to such a use, for example, the present brake may also be constructed as a disk brake, whereby the brake components would be stationary relative to a moving component which cooperates with the stationary brake shoe for closing the magnetic circuit.

Although the invention has been described with reference to specific example embodiments, it will be appreciated, that it is intended to cover all modifications and equivalents within the scope of the appended claims.

What is claimed is:

1. An electromagnetic sliding shoe brake apparatus for applying a predetermined brake force to a take-up member, comprising magnetic core means (1.3; 1.4) including pole piece means with respective pole faces (1.5), electric energizing magnetic coil means (1.1) operatively arranged for energizing said magnetic core means (1.3; 1.4), sliding brake shoe means (1.2) operatively arranged between said pole faces (1.5) and said brake force take-up member (4) for applying said predetermined brake force to said brake force take-up member (4), said sliding brake shoe means (1.2) comprising ferromagnetic pole plates (1.6) and magnetically insulating members (1.7), at least one of which is interposed between adjacent pole plates (1.6) interconnecting said ferromagnetic pole plates (1.6) to form said brake shoe means so that magnetically insulating members alternate with said pole plates, first connecting means (6) operatively securing said brake shoe means (1.2) to said core means for movement back and forth between a first position in which the pole plates are substantially in register with the respective pole faces and a second position in which the registering between the pole faces and the respective pole plates is reduced, whereby the magnetic resistance for the magnetic flux is varied as a function of said movement for varying the magnetic force, said movement taking place in a substantially frictionless manner, support means (2) for said magnetic core means (1.3; 1.4) and resilient means securing said magnetic core means thereto, and second connecting means (7) including spring means (7) biased in accordance with a required minimum brake force operatively connecting said sliding brake shoe means (1.2) to said support means (2), whereby said sliding brake shoe means (1.2) are displaceable in response to friction between the brake shoe means and the brake force take-up member (4) against the effect of said spring means (7), so that the electromagnetic attraction forces are automatically adjusted in accordance with the change in friction between the brake shoe means (1.2) and the take-up member (4).

2. The apparatus of claim 1, wherein said first connecting means comprise parallel guide bars (6), first pivot means operatively securing said parallel guide bars to said magnetic core means, second pivot means operatively securing said parallel guide bars to said brake shoe means for permitting the movement of said brake shoe means toward said brake force take-up member.

3. The apparatus of claim 1, wherein said brake shoe means comprise an end extension at each end which extends longitudinally outside the pole piece means of the magnetic core means in opposite directions.

4. The apparatus of claim 1, wherein said resilient means comprise spring means (3) for operatively suspending the apparatus from a rail vehicle, especially a high speed rail vehicle.

5. The apparatus of claim 1, wherein said brake shoe means comprise lateral extensions reaching upwardly along the sides of the pole piece means of the magnetic core means.

* * * * *